(12) United States Patent
Mizoguchi

(10) Patent No.: US 12,018,933 B2
(45) Date of Patent: Jun. 25, 2024

(54) ACCURACY DIAGNOSTIC DEVICE AND ACCURACY DIAGNOSTIC METHOD FOR MACHINE TOOL

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/303,724

(22) Filed: Jun. 7, 2021

(65) Prior Publication Data

US 2021/0404800 A1 Dec. 30, 2021

(30) Foreign Application Priority Data

Jun. 25, 2020 (JP) ................................ 2020-109879

(51) Int. Cl.
*G01B 21/16* (2006.01)
*G01M 99/00* (2011.01)

(52) U.S. Cl.
CPC .......... *G01B 21/16* (2013.01); *G01M 99/005* (2013.01)

(58) Field of Classification Search
CPC .......... B23Q 15/18; G01B 5/004; G01B 5/20; G01B 21/042; G01B 21/16; G01D 18/00; G01M 99/005; G05B 19/401; G05B 19/404; G05B 19/4065; G05B 2219/37605; G05B 2219/39021; G05B 2219/49206; G05B 2219/50139
See application file for complete search history.

(56) References Cited

U.S. PATENT DOCUMENTS

| 4,602,540 A | 7/1986 | Murofushi et al. |
| 6,748,790 B2 * | 6/2004 | Abbe .................. G01B 21/042 73/1.79 |

(Continued)

FOREIGN PATENT DOCUMENTS

| JP | S52-030987 A | 3/1977 |
| JP | S58-090442 A | 5/1983 |

(Continued)

OTHER PUBLICATIONS

Japanese Office Action (with English translation) dated Jan. 9, 2024 (Application No. 2020-109879).

*Primary Examiner* — Giovanni Astacio-Oquendo
*Assistant Examiner* — Martin Walter Braunlich
(74) *Attorney, Agent, or Firm* — BURR PATENT LAW, PLLC

(57) ABSTRACT

An accuracy diagnostic device for a machine tool diagnoses an accuracy of the machine tool. The machine tool includes a change amount detection unit that measures a change amount. The change amount changes due to an installation environment and an operational motion. The accuracy diagnostic device includes a change-amount-reference-value recording unit that records a reference value of the change amount. The accuracy diagnostic device obtains the change amount measured by the change amount detection unit. The accuracy diagnostic device diagnoses a change of the accuracy of the machine tool based on a first change index derived from a magnitude of a change of the change amount per a predetermined period and a second change index derived from the current change amount and the reference value.

1 Claim, 8 Drawing Sheets

(56) References Cited

U.S. PATENT DOCUMENTS

| | | | | |
|---|---|---|---|---|
| 10,353,373 B2* | 7/2019 | Suzuki | ................. | G05B 19/404 |
| 11,650,565 B2* | 5/2023 | Watanabe | .............. | G01K 13/00 |
| | | | | 700/173 |
| 2015/0160049 A1 | 6/2015 | Oki | | |
| 2018/0328705 A1* | 11/2018 | Sprenger | ............ | G01D 5/34746 |
| 2019/0011327 A1* | 1/2019 | Phommasith | ......... | G01M 13/00 |

FOREIGN PATENT DOCUMENTS

| JP | 2002-268742 A | 9/2002 |
|---|---|---|
| JP | 2006-272539 A | 10/2006 |
| JP | 6295070 B2 | 3/2018 |
| JP | 2019-136846 A1 | 8/2019 |

\* cited by examiner

ACCURACY DIAGNOSTIC DEVICE AND ACCURACY DIAGNOSTIC METHOD FOR MACHINE TOOL

BACKGROUND OF THE INVENTION

This application claims the benefit of Japanese Patent Application Number 2020-109879 filed on Jun. 25, 2020, the entirety of which is incorporated by reference.

TECHNICAL FIELD OF THE INVENTION

The disclosure relates to an accuracy diagnostic device and an accuracy diagnostic method for a machine tool that diagnose an influence on an accuracy of a machine tool by an environment where the machine tool is installed and an operational motion.

DESCRIPTION OF RELATED ART

When performing a machining of a workpiece using a machine tool, a temperature change in an installation environment of the machine tool and heat generation during an operation thermally deform various portions of the machine tool. As a result, a relative positional change between a main spindle and a workpiece, namely, a thermal displacement of the machine tool is generated in some cases to degrade an accuracy of, for example, a machining of the workpiece. As a method for reducing the thermal displacement in the machine tool, for example, a thermal displacement correction has been widely used. In the thermal displacement correction, temperature sensors are mounted on respective portions of a structure of the machine tool (hereinafter also referred to as a machine body), amounts of thermal displacements of the machine tool are calculated based on the measured temperature, and amounts of axial movements are changed corresponding to the amounts of calculated thermal displacements. However, an accuracy of the thermal displacement correction has a limitation, and an error occurs when a temperature change is large.

As a countermeasure for a large temperature change, Japanese Unexamined Patent Application Publication No. 2019-136846 (JP2019-136846A) discloses a method for diagnosing a state of a machine tool based on a calculated influence degree. The influence degree to a workpiece-machining-accuracy change of the machine tool is calculated from a temperature change rate of the machine body because an error of a thermal displacement correction becomes large especially when a rapid temperature change occurs.

When the machine tool is used for a long period, the temperature of the machine body gradually changes, and a large temperature change from start of use results in a large error of the thermal displacement correction in some cases. As a known countermeasure method in this case, it is known a method that maintains an accuracy by absorbing an error. The error is absorbed by remeasuring and updating correction values of the coordinates of the machine tool, for example, such as a workpiece origin offset value and a tool length offset value. In addition, Japanese Patent No. 6295070 discloses a method that indexes a rotary table to measure a position of a measurement object jig on the table at a plurality of angles, thereby identifying and correcting a geometrical error and a scaling error to maintain an accuracy of a machine.

The method disclosed by JP2019-136846A can detect an occurrence of a rapid temperature change and is effective in determining a quality of the installation environment of the machine tool and determining whether to start a machining or a measurement that ends in a relatively short period of about several minutes to one hour or not. However, it is difficult to deal with a situation where the displacement increases due to a gradual temperature change over a long period of time.

On the other hand, in the situation where the displacement increases due to a gradual temperature change over a long period of time, it can be said that the above-described known countermeasure method and the method disclosed in Japanese Patent No. 6295070 are effective. However, since an operator is required to determine when to perform the measurement for the displacement correction based on his/her experience, the measurement cannot be performed at a timing when the measurement is needed or is performed excessively frequently. Thus, it is likely that there will be a decline in productivity. Furthermore, the method described in Japanese Patent No. 6295070 performs the measurement of the positions of the measurement object jig on the rotary table at the plurality of angles, and thus it takes time for the measurement. Consequently, when the measurement is performed in a situation where the temperatures rapidly change, the thermal displacement possibly occurs during the measurement to degrade a measurement accuracy.

Therefore, it is an object of the disclosure to provide an accuracy diagnostic device and an accuracy diagnostic method for a machine tool that can diagnose an accuracy change due to the thermal displacement even in a rapid temperature change and in a gradual temperature change and can indicate an appropriate timing to perform a measurement for the displacement correction. The measurement for displacement correction is performed on, for example, correction values of the coordinates of the machine tool, such as the workpiece origin offset value and the tool length offset value.

SUMMARY

In order to achieve the above-described object, there is provided an accuracy diagnostic device for a machine tool according to a first aspect of the disclosure. The accuracy diagnostic device diagnoses an accuracy of the machine tool. The machine tool includes a change amount detection unit that measures a change amount. The change amount changes due to an installation environment and an operational motion. The accuracy diagnostic device includes a change-amount-reference-value recording unit that records a reference value of the change amount. The accuracy diagnostic device obtains the change amount measured by the change amount detection unit. The accuracy diagnostic device diagnoses a change of the accuracy of the machine tool based on a first change index derived from a magnitude of a change of the change amount per a predetermined period and a second change index derived from the current change amount and the reference value.

The disclosure according to a second aspect, which is in the above-described configuration, includes an accuracy diagnosis unit that derives a first diagnostic result by diagnosing the change of the accuracy based on the first change index and derives a second diagnostic result by diagnosing the change of the accuracy based on the second change index.

The disclosure according to a third aspect, which is in the above-described configuration, includes an accuracy-score calculator that calculates a first accuracy score and a second accuracy score. The first accuracy score is a magnitude of an influence on the accuracy of the machine tool by the change amount quantified based on the first change index and the second accuracy score is a magnitude of an influence on the accuracy of the machine tool by the change amount quantified based on the second change index.

In the disclosure according to a fourth aspect, which is in the above-described configuration, the accuracy diagnosis unit derives the first diagnostic result from the first accuracy score and derives the second diagnostic result from the second accuracy score, based on a predetermined threshold.

The disclosure according to a fifth aspect, which is in the above-described configuration, includes a diagnostic-result notification unit that notifies the first diagnostic result and the second diagnostic result.

The disclosure according to a sixth aspect, which is in the above-described configuration, includes an accuracy-countermeasure determining unit that determines an accuracy countermeasure for ensuring the accuracy of the machine tool, using a combination of the first diagnostic result and the second diagnostic result.

The disclosure according to a seventh aspect, which is in the above-described configuration, includes an accuracy-countermeasure execution unit that executes or cancels a machining with the machine tool or a program performing an on-machine-measurement, in accordance with the accuracy countermeasure determined at the accuracy-countermeasure determining unit.

In the disclosure according to an eighth aspect, which is in the above-described configuration, the accuracy-countermeasure determining unit represents the first diagnostic result and the second diagnostic result as good or poor. When the first diagnostic result is poor, the accuracy-countermeasure determining unit determines not to start or suspend a machining and an on-machine-measurement with the machine tool until the first diagnostic result becomes good again. On the other hand, when the first diagnostic result is good and the second diagnostic result is poor, the accuracy-countermeasure determining unit determines to perform a reset of correction value of coordinate of the machine tool before starting or continuing a machining and an on-machine-measurement with the machine tool.

In the disclosure according to a ninth aspect, which is in the above-described configuration, the accuracy-countermeasure determining unit represents the first diagnostic result and the second diagnostic result as good or poor. When any of the first diagnostic result and the second diagnostic result is poor, the accuracy-countermeasure determining unit determines to perform a reset of a correction value of coordinate of the machine tool.

In the disclosure according to a tenth aspect, which is in the above-described configuration, the accuracy-countermeasure determining unit represents the first diagnostic result and the second diagnostic result as good or poor. When the second diagnostic result is poor and the first diagnostic result is good, the accuracy-countermeasure determining unit determines that a timing is suitable for measurement to calibrate the accuracy of the machine tool.

In the disclosure according to an eleventh aspect, which is in the above-described configuration, the change amount is a temperature.

The disclosure according to a twelfth aspect, which is in the above-described configuration, provides an accuracy diagnostic method for a machine tool that diagnoses an accuracy of the machine tool. The machine tool includes a change amount detection unit that measures a change amount, the change amount changing due to an installation environment and an operational motion. The accuracy diagnostic method includes: obtaining the change amount from the change amount detection unit; and diagnosing a change of the accuracy of the machine tool based on a first change index derived from a magnitude of a change of the change amount per a predetermined period and a second change index derived from the current change amount and the reference value.

With the accuracy diagnostic device for the machine tool according to the embodiment disclosed in the first aspect and the twelfth aspect, the first change index and the second change index are derived based on the change amount changing due to the installation environment and the operational motion of the machine tool, and use of the first change index and the second change index allows diagnosing the accuracy of the machine tool with respect to both situations of the rapid change and the gradual change.

With the accuracy diagnostic device for the machine tool according to the embodiment disclosed in the second aspect, in addition to the above-described effect, diagnosing both the first change index and the second change index allows diagnosing whether the rapid change is occurring or not and whether the long-term change is occurring or not, respectively.

With the accuracy diagnostic device for the machine tool according to the embodiment disclosed in the third aspect, in addition to the above-described effect of the first aspect, continuously presenting values as the accuracy score allows grasping how stable the accuracy of the machine tool is, not whether the accuracy of the machine tool is good or poor.

With the accuracy diagnostic device for the machine tool according to the embodiment disclosed in the fourth aspect, in addition to the above-described effect, the quality of the accuracy of the machine tool can be diagnosed in consideration of stability of the accuracy.

With the accuracy diagnostic device for the machine tool according to the embodiment disclosed in the fifth aspect, in addition to the above-described effect, notifying an operator of the respective diagnostic results of the first change index and the second change index allows the operator to know whether the rapid change is occurring or not and whether the long-term change is occurring or not.

With the accuracy diagnostic device for the machine tool according to the embodiment disclosed in the sixth aspect, in addition to the above-described effect, determining the countermeasure for ensuring the accuracy of the machine tool by combining the first diagnostic result and the second diagnostic result allows determining what to do for ensuring the accuracy of the machine tool. Furthermore, when any of the rapid change and the long-term change occurs, the countermeasure for ensuring the accuracy of the machine tool can be appropriately determined.

With the accuracy diagnostic device for the machine tool according to the embodiment disclosed in the seventh aspect, in addition to the above-described effect, it is possible to perform the machining and the measurement while automatically ensuring the accuracy of the machine tool, thus ensuring the improved productivity.

With the accuracy diagnostic device for the machine tool according to the embodiment disclosed in the eighth aspect, in addition to the above-described effect, determining whether to start the machining, the measurement, and or the like depending on the magnitude of the current change rate and determining the appropriate timing for resetting the correction values of the coordinates of the machine tool depending on the magnitude of the change from the previous setting of the correction values of the coordinates allows ensuring the accuracy of the machining, the measurement, and the like.

With the accuracy diagnostic device for the machine tool according to the embodiment disclosed in the ninth aspect, in addition to the above-described effect of the first aspect, both the accuracy and productivity, especially in mass production machining are improved by determining the appropriate timing for resetting the correction values of the coordinates of the machine tool depending on the magnitude of the current change rate and the magnitude of the change from the previous setting of the correction values of the coordinates.

With the accuracy diagnostic device for the machine tool according to the embodiment disclosed in the tenth aspect, in addition to the above-described effect, a timing suitable for the measurement to calibrate the accuracy of the machine tool can be expected by determining whether the measurement is required or not depending on the magnitude of the change from the previous calibration and whether the measurement with small error can be performed or not depending on the magnitude of the current change rate.

With the accuracy diagnostic device for the machine tool according to the embodiment disclosed in the eleventh aspect, in addition to the above-described effect, the change of the accuracy of the machine tool often occurs due to the thermal displacement, thereby the accuracy change of the machine tool due to the influence of the thermal displacement can be diagnosed.

DETAILED DESCRIPTION

The following describes embodiments of the disclosure based on drawings.

Figure 1:
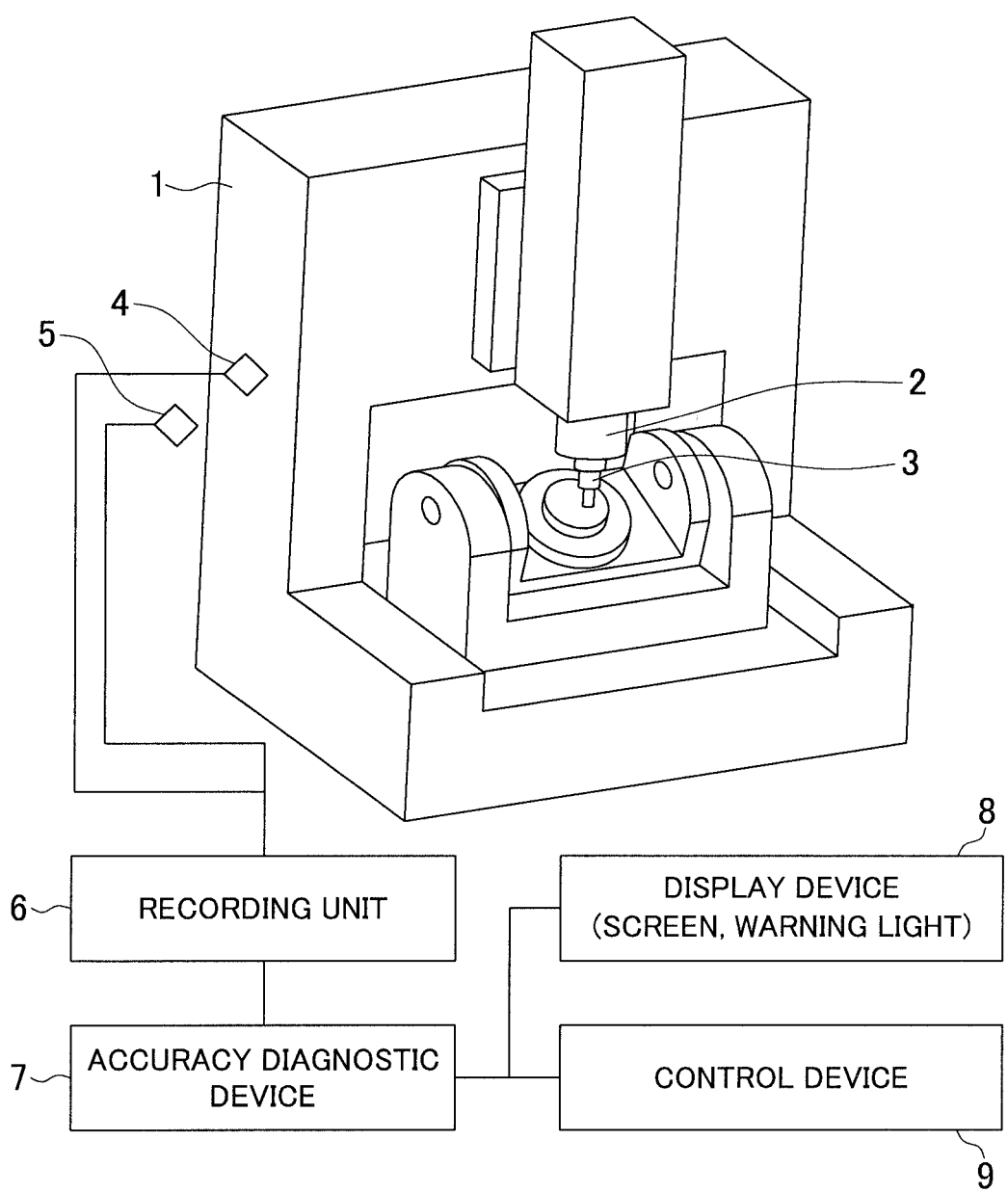
FIG. 1 is an explanatory diagram illustrating a machine tool of the disclosure.

FIG. 1 is an explanatory diagram illustrating a machine tool of the disclosure. While in FIG. 1, a cover and other facilities are omitted, an actual machine includes a cover and other facilities.

A five-axis machining center 1, which is a machine tool, includes a main spindle 2. A tool (not illustrated) is attached to the main spindle 2 to perform a machining of a workpiece. The measurement can also be performed by attaching a position measurement sensor 3 such as a touch probe.

The five-axis machining center 1 includes a machine body temperature sensor 4 and a temperature sensor 5 as a change amount detection unit, a recording unit 6, an accuracy diagnostic device 7, a display device 8, and a control device 9.

Since an accuracy change of the machine tool often occurs by a thermal displacement, an accuracy change due to an influence of the thermal displacement can be diagnosed by using temperature as a change amount.

The machine body temperature sensor 4 measures the temperature of the machine body, and the temperature sensor 5 measures the air temperature around the machine body. Pieces of temperature information measured by the machine body temperature sensor 4 and the temperature sensor 5 are taken into the recording unit 6 and recorded.

The accuracy diagnostic device 7, based on the temperature information taken into the recording unit 6, diagnoses an influence on the accuracy of the five-axis machining center 1 due to the temperature change.

The display device 8 is, for example, a control panel and displays a diagnostic result by the accuracy diagnostic device 7 on the screen. In addition to the diagnostic result in the display device 8, for example, a warning light and a buzzer (not illustrated) may be used to notify an operator.

The control device 9 determines a countermeasure for ensuring the accuracy of the five-axis machining center 1 based on the diagnostic result transmitted from the accuracy diagnostic device 7 and controls the machining of a workpiece and/or a measurement operation based on the determined countermeasure.

Next, the accuracy diagnostic device 7 is described in detail.

Figure 2A:
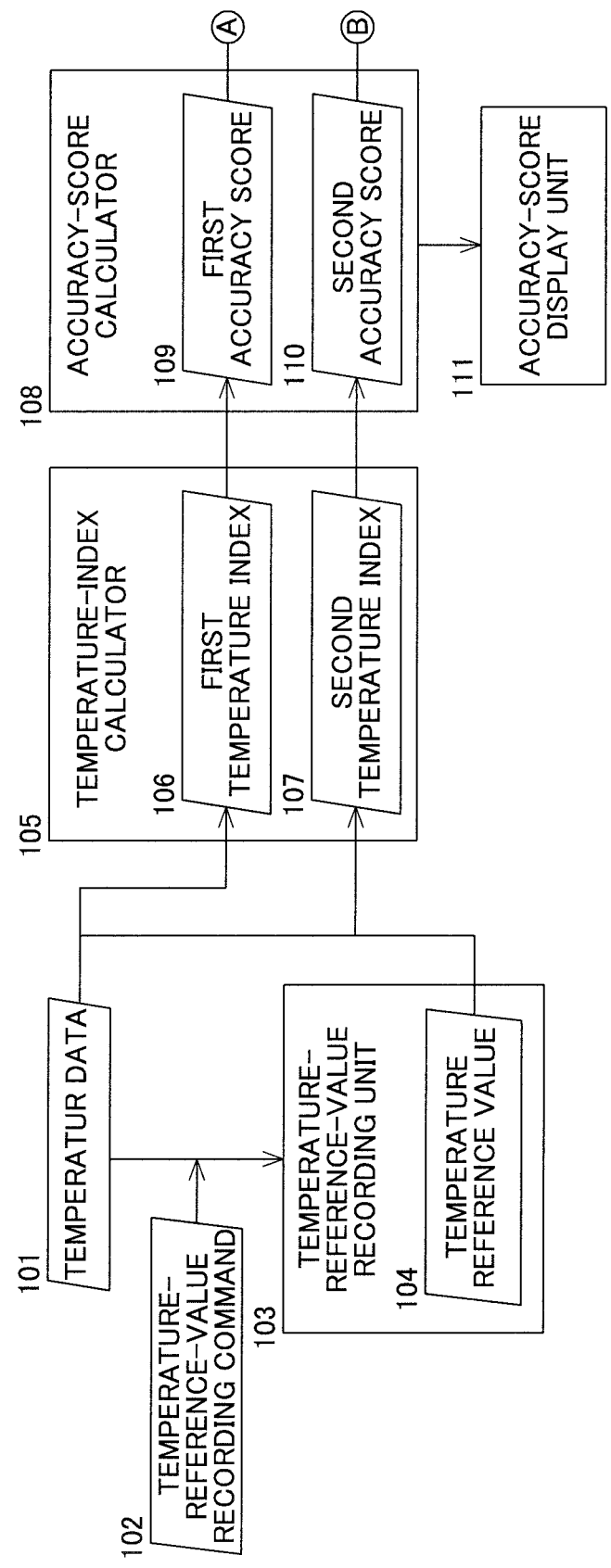
FIGS. 2A and 2B are block diagrams illustrating a configuration of an accuracy diagnostic device of the disclosure.
Figure 2B:
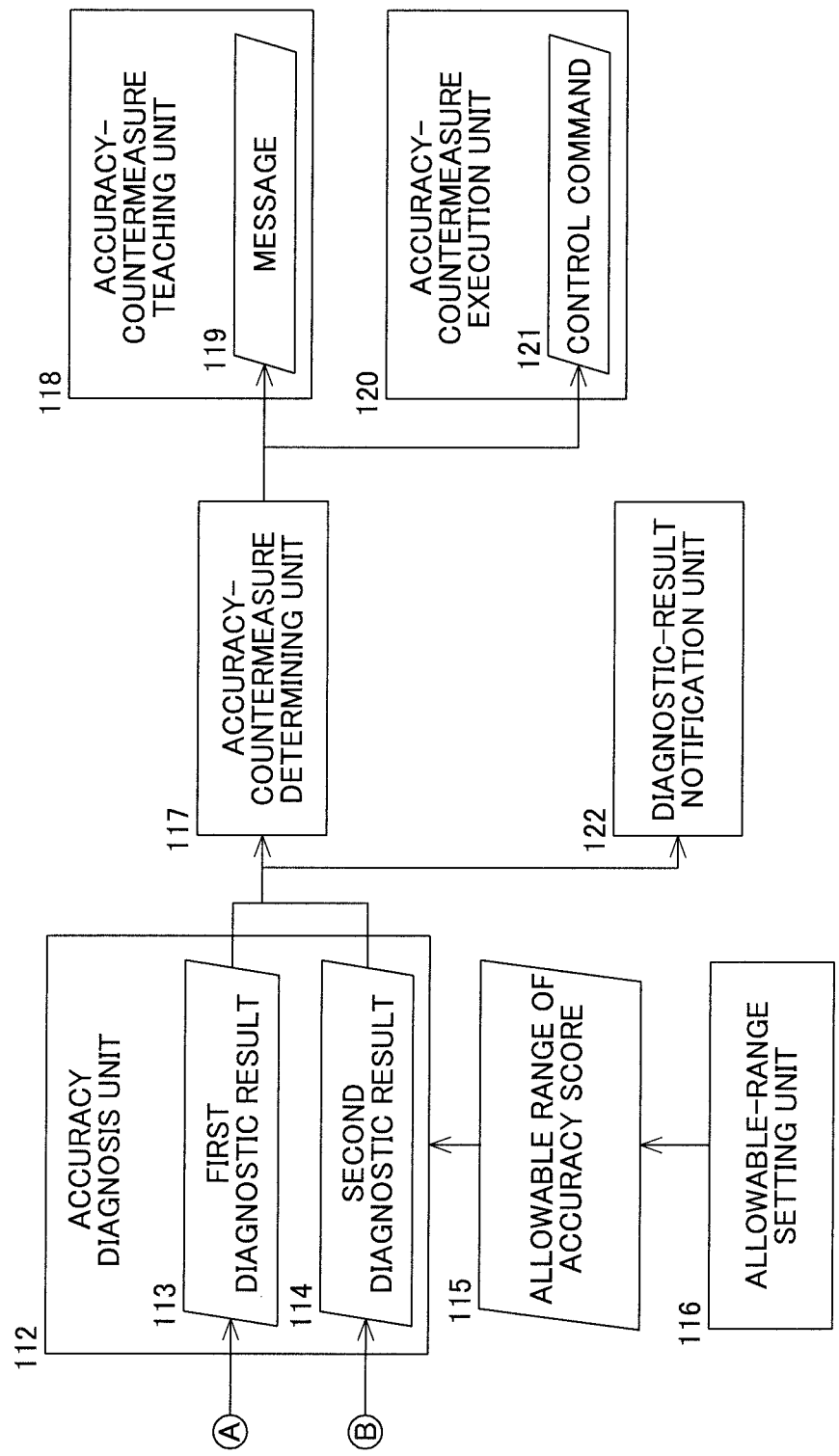

FIGS. 2A and 2B are block diagrams illustrating a configuration of the accuracy diagnostic device 7 of the disclosure.

The accuracy diagnostic device 7 includes a temperature-reference-value recording unit 103, a temperature-index calculator 105, an accuracy-score calculator 108, an accuracy-score display unit 111, an accuracy diagnosis unit 112, an allowable-range setting unit 116, an accuracy-countermeasure determining unit 117, an accuracy-countermeasure teaching unit 118, an accuracy-countermeasure execution unit 120, and a diagnostic-result notification unit 122.

The following describes the functions of the accuracy diagnostic device 7.

First, the accuracy diagnostic device 7 obtains temperature data 101 as the temperature information measured by the machine body temperature sensor 4 and the temperature sensor 5 and recorded in the recording unit 6. The obtained temperature data 101 is recorded in the temperature-reference-value recording unit 103 as a temperature reference value 104 in response to a temperature-reference-value recording command 102. The temperature-reference-value recording command 102 may be commanded by operating the control panel and the screen of the five-axis machining center 1 or may be commanded by executing a program code. Furthermore, the command may be automatically made in conjunction with a specific operation such as turning-on of power and a rewrite of a predetermined parameter. The temperature reference value 104 may be preliminarily set before the machining and the measurement of a workpiece irrespective of the temperature-reference-value recording command 102.

Next, the temperature-index calculator 105 calculates a first temperature index 106 as a first change index and a second temperature index 107 as a second change index.

The first temperature index 106 is, for example, a change rate of the temperature. The first temperature index 106 is calculated by using Formula 1. In the following Formula 1 shown below, θ shows a value of the measured temperature, Θ shows the temperature index, which is calculated. The first temperature index $\Theta_1(t)$ (106) is calculated as follows. First, a current temperature θ(t) and a temperature θ(t−Δt) before a predetermined time Δt are obtained from the recording unit 6 as the temperature data 101. Then, a difference between the current temperature θ(t) and the temperature θ(t−Δt) before a predetermined time Δt is taken to calculate a temperature change rate $\underline{\theta}(t)$ per unit time. Finally, the first temperature index $\Theta_1(t)$ (106) is calculated by converting the temperature change rate $\underline{\theta}(t)$ per unit time.

$$\Theta_1(t) = 3600 \times \dot{\theta}(t) = \frac{3600}{\Delta t}\{\theta(t) - \theta(t - \Delta t)\} \quad \text{(Formula 1)}$$

$\Theta_1(t)$: First temperature index (° C./hour)
Δt: Time interval (s)
θ(t): Measured temperature (° C.)
$\underline{\theta}(t)$: Change rate of measured temperature (° C./s)

Formula 1 is one example of a calculation method of the change rate, and another known numerical differentiation method can be used. For example, as disclosed in JP 2019-136846A, the change rate can be approximately obtained from a machine body temperature and an ambient temperature. While the first temperature index (106) is individually set as the change rate of the temperature, it is sufficient that the first temperature index (106) is an index representing a severity of the short-period temperature change. Thus, except for the temperature change rate, for example, a difference between the maximum value and the minimum value within a predetermined period may be set as the first temperature index (106).

The second temperature index 107 is a difference between the temperature reference value 104 ($\theta_0$) and the current temperature θ(t). The second temperature index 107 is calculated by using Formula 2.

$$\Theta_2(t) = \theta_t - \theta_0 \quad \text{(Formula 2)}$$

Subsequently, the accuracy-score calculator 108 calculates a first accuracy score 109 based on the first temperature index 106 and calculates a second accuracy score 110 based on the second temperature index 107. The first accuracy score 109 and the second accuracy score 110 are calculated by using, for example, Formula 3.

$$S_n(t) = \begin{cases} S_{min}(\Theta_A < |\Theta_n(t)|) \\ \frac{S_{max} - S_{min}}{\Theta_A - \Theta_B}(\Theta_A - |\Theta_n(t)|) \, (\Theta_B \leq |\Theta_n(t)| \leq \Theta_A) \\ S_{max}(|\Theta_n(t)| < \Theta_B) \end{cases} \quad \text{(Formula 3)}$$

$S_n(t)$: Accuracy score (n=1: first accuracy score, n=2: second accuracy score)
$S_{min}$: Accuracy score when accuracy is worst
$S_{max}$: Accuracy score when accuracy is best
$\Theta_n(t)$: Temperature index (n=1: first temperature index, n=2: second temperature index)
$\Theta_A$, $\Theta_B$: Constant In Formula 3, the accuracy score $S_n(t)$ is shown by a value between $S_{min}$ to $S_{max}$. The first accuracy score 109 is worst when a magnitude of an absolute value of the first temperature index 106 is larger than the constant $\Theta_A$, and the first accuracy score 109 is best when the magnitude of the absolute value of the first temperature index 106 is smaller than the constant $\Theta_B$. Similarly, the second accuracy score 110 is worst when the magnitude of the value of the second temperature index 107 is larger than the constant $\Theta_A$, and the second accuracy score 110 is best when the magnitude of the value of the second temperature index 107 is smaller than the constant OB.

Formula 3 is one example of the calculation method for calculating the respective accuracy scores 109, 110. The respective accuracy scores 109, 110 may be calculated by using another known formula.

FIG. 3A to 3E indicates examples where the changes of the first accuracy score 109 and the second accuracy score 110 with respect to certain temperature changes are calculated using Formula 1 to Formula 3.

Figure 3A:
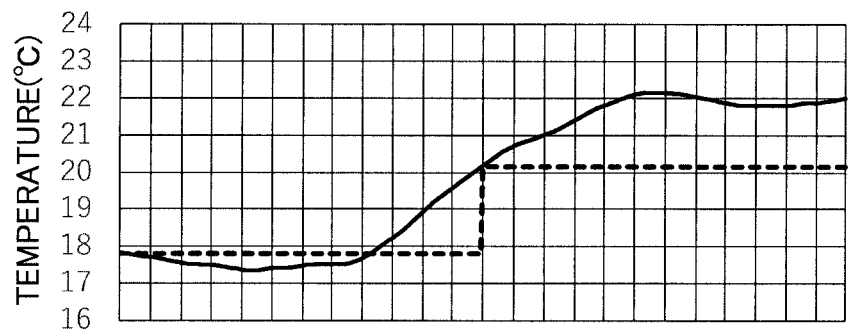
FIG. 3A is a graph representing a state of updating a temperature reference value.

FIG. 3A is a graph representing a state of updating the temperature reference value 104. The solid line represents a time change of the temperature, and the dashed line represents the temperature reference value 104. In this example, at the 0 hour and the 3 hour time point, the temperature-reference-value recording command 102 is commanded, and the temperatures θ(t) at the time are recorded as the temperature reference value $\theta_0$ (104). The temperature reference value $\theta_0$ (104) changes stepwise at the timing when the temperature-reference-value recording command 102 is commanded.

Figure 3B:
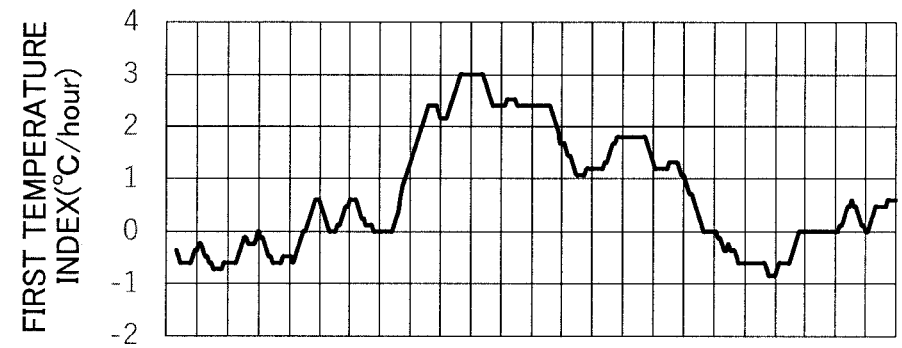
FIG. 3B is a graph representing a change of a first temperature index.

FIG. 3B is a graph representing a change of the first temperature index $\Theta_1(t)$ (106). Here, the first temperature index $\Theta_1(t)$ (106) was calculated by numerically differentiating the temperature θ(t) in accordance with Formula 1. As illustrated in FIG. 3A, since the temperature is gradually decreased between the 0 hour to the 1 hour, the first temperature indexes $\Theta_1(t)$ (106) are negative values. On the other hand, since the temperature significantly increases between the 2 hour to the 4 hour, the first temperature indexes $\Theta_1(t)$ (106) are positive values.

Figure 3C:
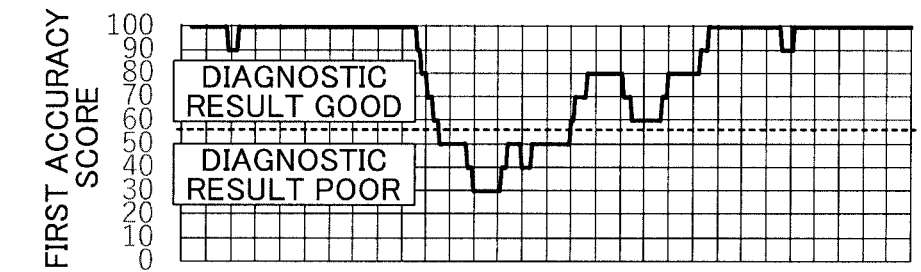
FIG. 3C is a graph representing a change of a first accuracy score.

FIG. 3C is a graph representing a change of the first accuracy score 109. Here, $S_{max}$ in Formula 3 is set to 100, and $S_{min}$ in Formula 3 is set to zero. When the temperature change is small, and the accuracy of the five-axis machining center 1 is stable, the accuracy score S(t) becomes 100. On the other hand, the accuracy score S(t) was calculated as a value in increments of 10 such that the accuracy score S(t) approaches zero as the temperature change increases and the accuracy increases in degree of instability. Here, the accuracy diagnosis unit 112 determines the first accuracy score 109 as good when it is 60 or more and diagnoses the first accuracy score 109 as poor when it is 50 or less. A threshold (an allowable range 115 that is described later) for determining the quality is set by the allowable-range setting unit 116.

When the degree of temperature change between the 0 hour and the 2 hour is gradual as indicated in FIG. 3A, the first accuracy score 109 shows 100, and when the temperature between the 2 hour to the 4 hour rapidly increases as indicated in FIG. 3A, it is shown that the value of the first accuracy score 109 decreases.

Figure 3D:
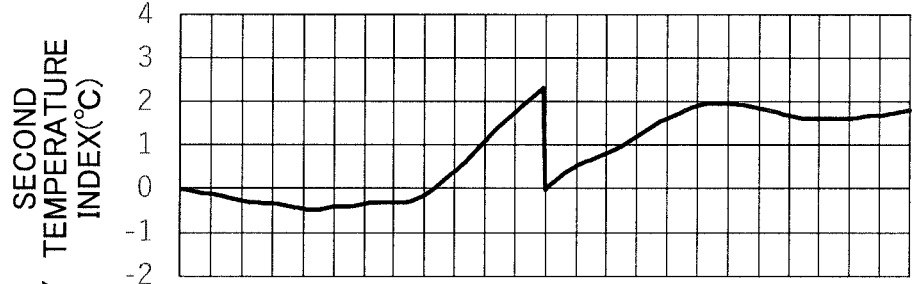
FIG. 3D is a graph representing a change of a second temperature index.

FIG. 3D is a graph representing a change of the second temperature index $\Theta_2(t)$ (107). In accordance with Formula 2, the second temperature index $\Theta_2(t)$ (107) was calculated as a difference between the temperature θ(t) and the temperature reference value $\theta_0$ (104). The temperature $\theta(t)$ and the temperature reference value $\theta_0$ (104) become equal at the timings when the temperature-reference-value recording command 102 was commanded, namely, at the 0 hour and the 3 hour time point. Thus, the value of the second temperature index $\Theta_2(t)$ (107) is zero at the respective time points.

Figure 3E:
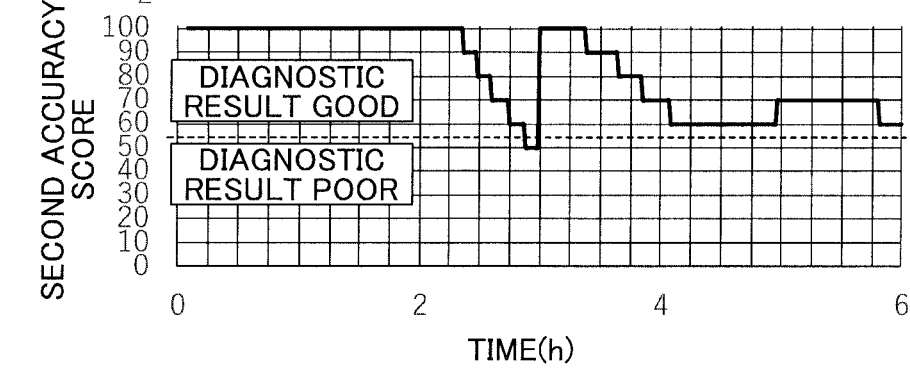
FIG. 3E is a graph representing a change of a second accuracy score.

FIG. 3E is a graph representing a change of the second accuracy score 110. Here, similarly to the first accuracy score 109, $S_{max}$ in Formula 3 is set to 100, and $S_{min}$ in Formula 3 is set to zero. Here, the accuracy diagnosis unit 112 determines the second accuracy score 110 as good when it is 60 or more and diagnoses the second accuracy score 110 as poor when it is 50 or less. The threshold (the allowable range 115 that is described later) for determining the quality is set by the allowable-range setting unit 116.

As indicated in FIG. 3D, at the 0 hour and the 3 hour time point, the difference between the temperature $\theta(t)$ and the temperature reference value $\theta_0$ (104) at the respective time points is zero, the second accuracy score 110 shows 100. On the other hand, as the temperature changes over time, the value of the second accuracy score 110 decreases.

The calculated first accuracy score 109 and second accuracy score 110 become a measure for determining the quality of the accuracy of the machining and the measurement for the current workpiece. Thus, the accuracy-score display unit 111 displays the accuracy score on the display device 8. The accuracy diagnosis unit 112 diagnoses the quality of the accuracy of the current five-axis machining center 1. The allowable-range setting unit 116 sets the allowable range 115 for the first accuracy score 109 and the second accuracy score 110 through, for example, an input of a numerical value on the control panel and a program. The allowable range 115 can be conveniently changed by the allowable-range setting unit 116. The accuracy diagnosis unit 112 compares the set allowable range 115 with each of the first accuracy score 109 and the second accuracy score 110 to diagnose. For the diagnostic results, the diagnostic result for the first accuracy score 109 is set as a first diagnostic result 113, and the diagnostic result for the second accuracy score 110 is set as a second diagnostic result 114.

The accuracy-countermeasure determining unit 117 determines whether an accuracy countermeasure for correcting the accuracy of the five-axis machining center 1 is required or not using a combination of the quality of the first diagnostic result 113 and the quality of the second diagnostic result 114. When the accuracy countermeasure is required, it is determined what accuracy countermeasure to perform. When teaching and causing an operator to perform the accuracy countermeasure determined by the accuracy-countermeasure determining unit 117, the accuracy-countermeasure teaching unit 118 causes the display device 8 to output it as a message 119. On the other hand, when causing the five-axis machining center 1 to automatically execute the accuracy countermeasure determined by the accuracy-countermeasure determining unit 117, the accuracy-countermeasure execution unit 120 outputs a control command 121.

The message 119 is generated corresponding to the respective results of the first diagnostic result 113 and the second diagnostic result 114. For example, when the first diagnostic result 113 is poor, suspension of the machining and the measuring is indicated. Furthermore, for example, when the second diagnostic result 114 is poor, it is indicated that a required accuracy countermeasure, for example, remeasuring the correction values of the coordinates such as the workpiece origin. At the time, for example, an alarm may be displayed to more intensely indicate the message 119.

Especially, when the diagnostic result indicates the degradation of the accuracy, in addition to the display of the message 119 by the accuracy-countermeasure teaching unit 118, the control command 121 for suspending the operation of the five-axis machining center 1 by the program may be output to the accuracy-countermeasure execution unit 120. The output of the message 119 by the accuracy-countermeasure teaching unit 118 is not limited to the display device 8 and may be a notification mail to, for example, a terminal owned by the operator. The output other than the output with characters, for example, lighting of a warning light and an alarm may be used.

The control command 121 is generated corresponding to the respective results of the first diagnostic result 113 and the second diagnostic result 114. For example, when the first diagnostic result 113 is poor, the control command 121 for suspending the machining and the measurement is generated. For example, when the second diagnostic result 114 is poor, the control command 121 for executing a required accuracy countermeasure which remeasures the correction values of the coordinates such as the workpiece origin are generated. The generated control command 121 is output to the control device 9. In accordance with the input control command 121, the control device 9 automatically executes the required control of five-axis machining center 1.

The diagnostic-result notification unit 122 notifies by causing the display device 8 to display the first diagnostic result 113 and the second diagnostic result 114. The diagnostic result is displayed such that the respective qualities of the first diagnostic result 113 and the second diagnostic result 114 can be understood. The notification method of the diagnostic result is not limited to the display by the display device 8 and may be a notification mail to, for example, a terminal owned by the operator. The notification method may be other than the output with the characters and may be, for example, lighting of a warning light and an alarm. Furthermore, the notification method may be changed using a combination of the quality of the first diagnostic result 113 and the second diagnostic result 114. For example, when the first diagnostic result 113 is degraded, an alarm may be generated in addition to the display to the display device 8, and when the second diagnostic result 114 is degraded, only the display to the display device 8 may be performed. Furthermore, an alarm may be generated only when both the first diagnostic result 113 and the second diagnostic result 114 are degraded, and, in other cases, only the display to the display device 8 may be performed.

Figure 4:
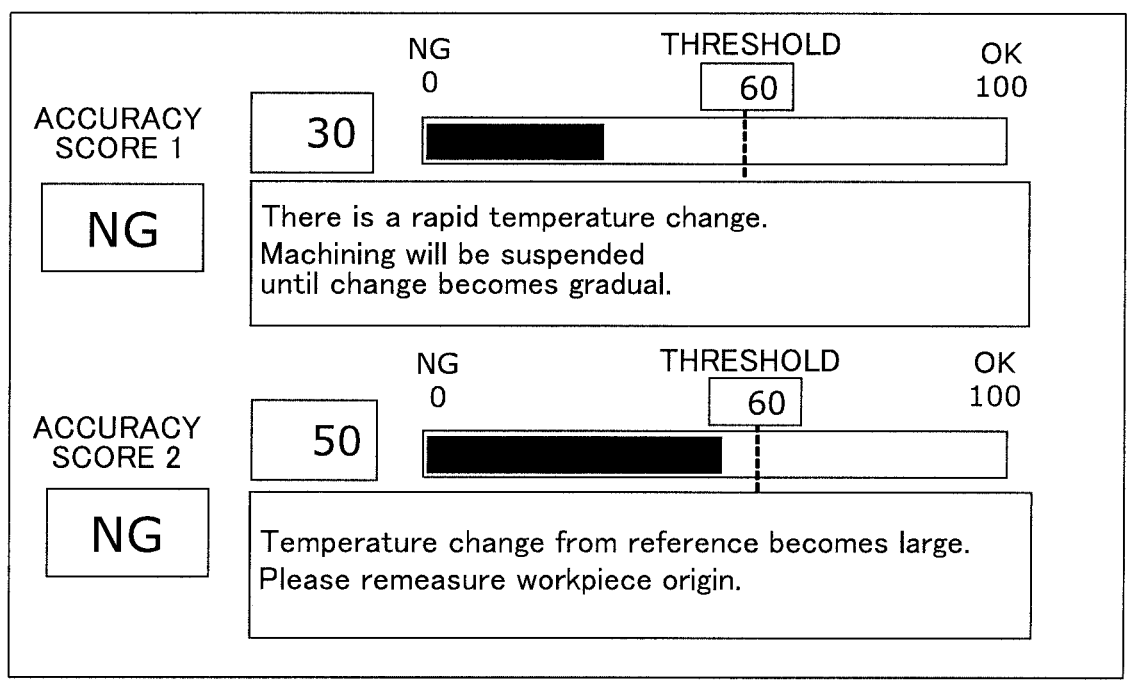
FIG. 4 is an explanatory diagram illustrating an example of a screen displaying a diagnostic result of an accuracy.

FIG. 4 is one example of a screen display of the display device 8 where the accuracy-score display unit 111, the allowable-range setting unit 116, and the accuracy-countermeasure teaching unit 118 are provided.

The respective numerical values of the first accuracy score 109 and the second accuracy score 110 and bar graphs visually representing the magnitudes of them are displayed. The allowable range 115 set by the allowable-range setting unit 116 is displayed for each of the first accuracy score 109 and the second accuracy score 110. Furthermore, the message 119 generated by the accuracy-countermeasure teaching unit 118 is displayed for each of the first accuracy score 109 and the second accuracy score 110. Thus, displaying the accuracy score, the allowable range 115, and the message 119 on one screen allows visually understanding the accuracy of the five-axis machining center 1 and a diagnostic criterion of the accuracy. The information to be displayed is not limited to the above-described items. For example, the graphs illustrated in FIG. 3 may be displayed, and the information indicating the operation of the five-axis machining center 1, such as a main spindle rotational speed may be displayed.

The following describes a determination method of the accuracy countermeasure of the accuracy-countermeasure determining unit 117 and the accuracy countermeasure to be performed by using determination examples 1 to 3.

The determination example 1 assumes when the machining or an on-machine measurement for a relatively long period of, for example, one hour or more is performed.

Figure 5:
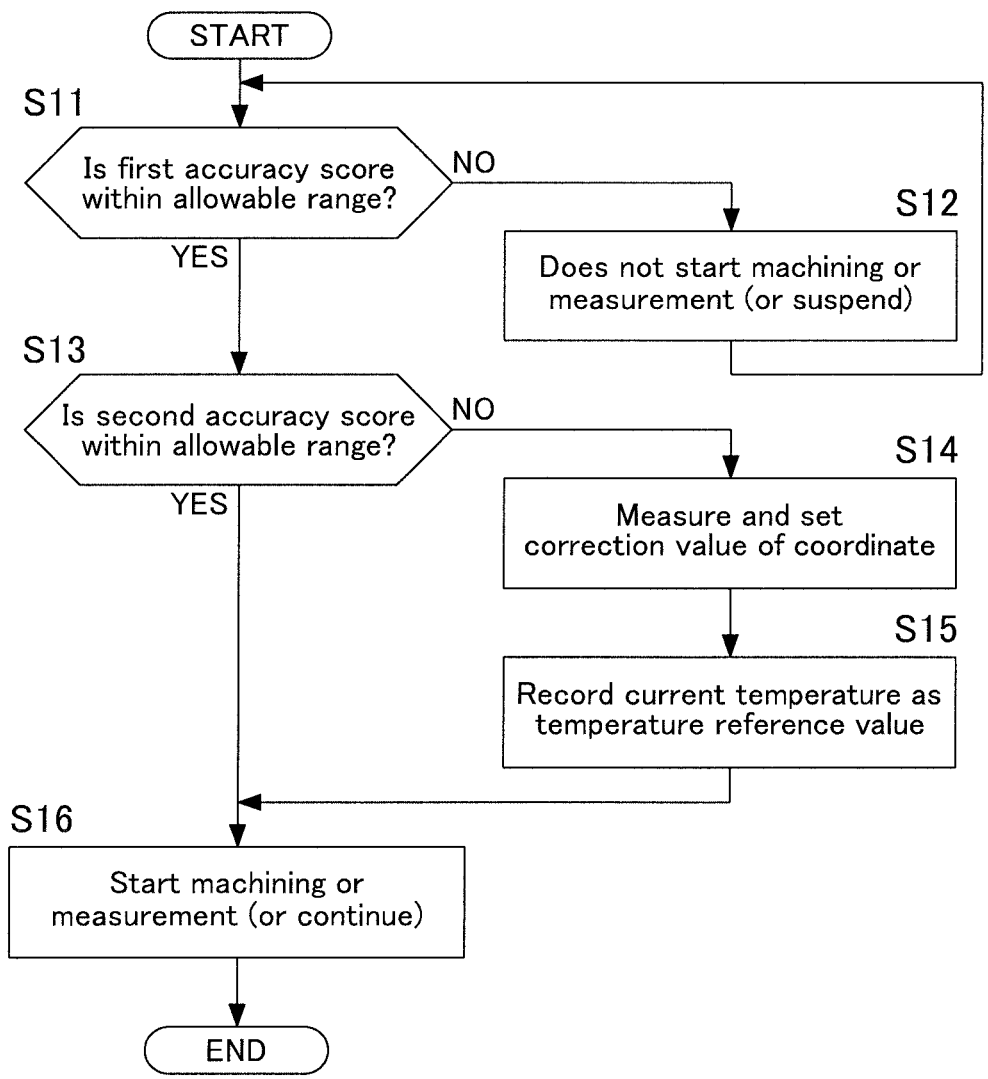
FIG. 5 is a flowchart for determining timings of a start of a machining and a workpiece-origin setting when a machining for a workpiece with a long machining period is performed.

FIG. 5 is a flowchart for determining the timings of the machining start and the workpiece origin setting when performing a machining of a workpiece with a long machining period. That is, FIG. 5 is a flowchart indicating the determination method of the accuracy-countermeasure determining unit 117 and the accuracy countermeasure to be performed in the determination example 1. The timing of the diagnosis in the determination example 1 is mainly executed at a start of the workpiece machining and the on-machine measurement.

The longer the period required for the machining and the on-machine measurement is, the more the accuracy of the machining and the on-machine measurement is susceptible to the thermal displacement due to the temperature change. When the machining and the on-machine measurement are started in a state where the temperature change is rapid, the machining and the on-machine measurement are significantly affected by the thermal displacement. Thus, when it is desired to perform the machining and the on-machine measurement with high accuracy, it is preferred to wait until the temperature change becomes gradual before starting the machining and the on-machine measurement. When coordinate correction values such as the workpiece origin are measured and set after the temperature change has become gradual, and then the machining and the on-machine measurement are started, the machining and the on-machine measurement can be performed with high accuracy.

First, the first accuracy score 109 is checked whether it is within the range of the allowable range 115 (S11) or not. When the first accuracy score 109 is within the range of the allowable range 115, that is, when the temperature change is gradual, the process proceeds to S13. On the other hand, when the first accuracy score 109 is not within the range of the allowable range 115, that is, when the temperature change is rapid, the process proceeds to S12 because the accuracy of the machining and the measurement is possibly degraded. At S12, the machining and the measurement do not start until the first accuracy score 109 becomes within the range of the allowable range 115.

Next, the second accuracy score 110 is checked whether it is within the range of the allowable range 115 (S13) or not. When the second accuracy score 110 is within the range of the range of the allowable range 115, the process proceeds to S16, and the machining and the measurement are immediately started. When the second accuracy score 110 is not within the range of the allowable range 115, that is, when the temperature change since a time point where the temperature reference value 104 was previously set is large, the process proceeds to S14, and the correction values of the coordinates such as the workpiece origin are measured and set. For example, a workpiece original position or similar position is measured using a touch probe, which is the position measurement sensor 3, and the workpiece origin offset value or similar value is updated. Then, the temperature at the time point is recorded as the temperature reference value 104 (S15). With the processing, since the difference between the current temperature and the temperature reference value 104 becomes zero, the second accuracy score 110 falls within the range of the allowable range 115 and the accuracy becomes in a good state. Afterward, the machining and the measurement are started (S16).

The above-described processing may be performed only at the start time of the machining and the on-machine measurement of the workpiece. Alternatively, the above-described processing may also be performed at the predetermined timings during the machining and during the on-machine measurement in addition to the time point of the start of the machining and the on-machine measurement of the workpiece. When performing the above-described processing also at the predetermined timings during the machining and during the on-machine measurement, at S12, the machining or the on-machine measurement is suspended until the first accuracy score 109 falls within the range of the allowable range 115. Then, when the first accuracy score 109 falls within the range of the allowable range 115, the machining or the on-machine measurement is resumed.

In the determination example 1, while it is assumed that the accuracy countermeasure is automatically executed by the accuracy-countermeasure execution unit 120, an operator may execute the required accuracy countermeasure in accordance with the teaching by the accuracy-countermeasure teaching unit 118. In this case, at S12, the accuracy-countermeasure teaching unit 118 teaches the operator by, for example, displaying a message 119 indicating the necessity of waiting until the temperature change becomes gradual due to the current rapid temperature change on the display device 8 or sounding an alarm. At S14, it is taught that it is necessary to measure and set the correction values of the coordinates.

Appropriately executing the accuracy countermeasure as described above ensures the accuracy of the machining and the on-machine measurement.

The determination example 2 assumes a case of a mass production machining where the machining period per one workpiece is relatively short, for example, within several minutes to one hour, and the same machining is repeatedly performed.

Figure 6:
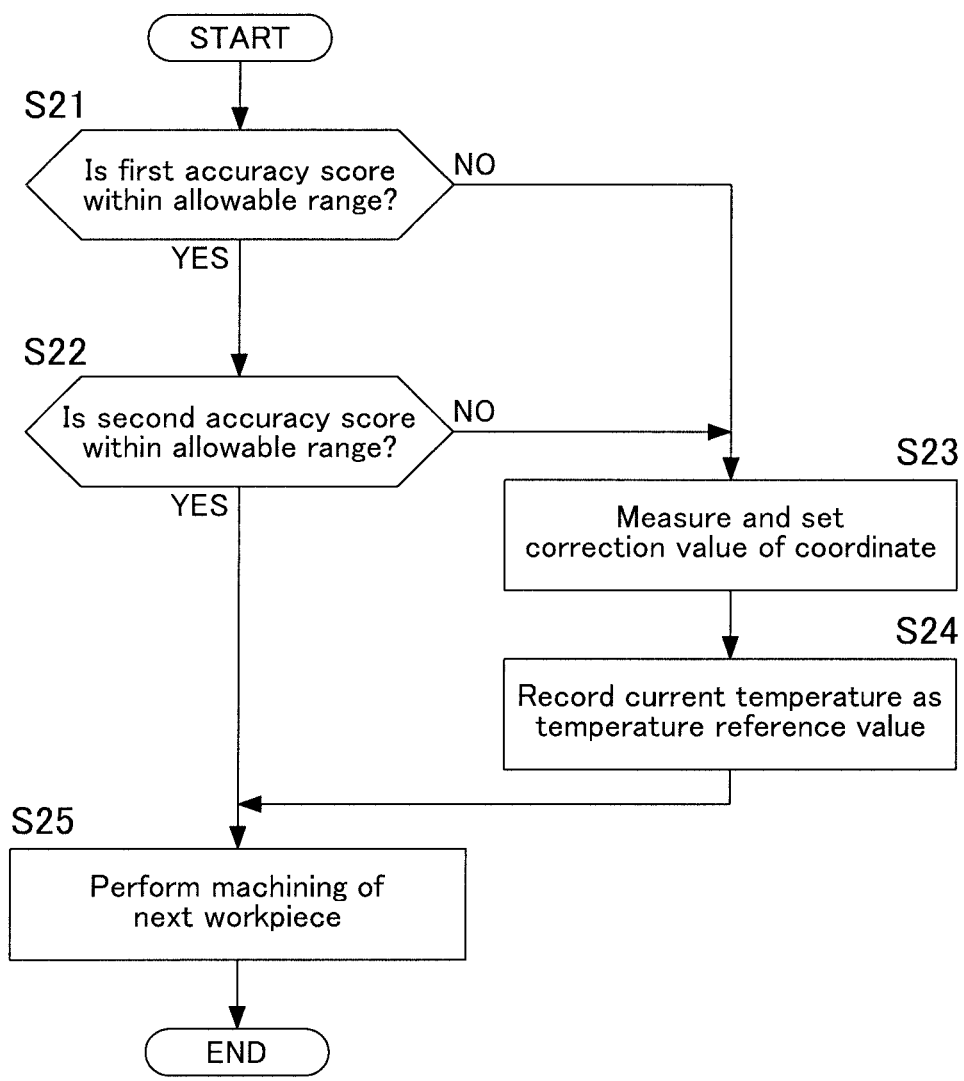
FIG. 6 is a flowchart for determining timings of a start of a machining and a workpiece-origin setting when a machining for a workpiece with a short machining period is repeatedly performed.

FIG. 6 is a flowchart for determining the timings of the machining start and the workpiece-origin setting when a machining of a workpiece with a short machining period is repeatedly performed. That is, FIG. 6 is a flowchart indicating the determination method of the accuracy-countermeasure determining unit 117 and the accuracy countermeasure to be performed, in the determination example 2. The timing of the diagnosis in the determination example 2 is executed for each end of the machining of one or a predetermined number of workpieces.

In the mass production machining, not only the accuracy but also productivity to perform a machining of a large number of workpieces in a short period is required. Thus, the diagnosis is performed so that the measurement of the coordinate correction values such as the tool length offset and the workpiece origin can be performed at the minimum necessary timing for ensuring the accuracy. Since the accuracy is possibly degraded even in a short period in a state where the temperature change is rapid, it is required to perform the diagnosis for each machining of one workpiece. On the other hand, in a state where the temperature change is gradual, the diagnosis is performed when the temperature change since the previous diagnosis becomes large.

First, the first accuracy score 109 is checked whether it is within the range of the allowable range 115 (S21) or not. When the first accuracy score 109 is within the range of the allowable range 115, that is, when the temperature change is gradual, the process proceeds to S22. On the other hand, when the first accuracy score 109 is not within the range of the allowable range 115, that is, when the temperature change is rapid, the process proceeds to S23 because the accuracy is possibly degraded even in a short period. At S23, the coordinate correction values such as the tool length offset and the workpiece origin are measured and set. Then, the temperature at the time point is recorded as the temperature reference value 104 (S24). With the processing, variations of the machining accuracy of the workpiece can be minimally reduced even when the temperature change is rapid. Afterward, the machining for the next workpiece is started (S25).

Next, when the temperature change is gradual, the second accuracy score 110 is checked whether it is within the range of the allowable range 115 (S22) or not. When the second accuracy score 110 is not within the range of the allowable range 115, that is, the temperature change is large since the time point at which the coordinate correction values such as the tool length offset and the workpiece origin were measured and set, the accuracy is possibly degraded due to the temperature change gradually occurred during a long period use. Thus, the coordinate correction values are remeasured and reset (S23). Then, the temperature at the time point is recorded as the temperature reference value 104 (S24). With the processing, since the difference between the current temperature and the temperature reference value 104 becomes zero, the second accuracy score 110 falls within the range of the allowable range 115, and the accuracy becomes in a good state. Afterward, the machining for the next workpiece is started (S25).

The measurement at S23 may be automatically performed by the machine with the position measurement sensor 3, such as the touch probe, by the accuracy-countermeasure execution unit 120 outputting a command to the control device 9. Instead, teaching an operator the necessity of the measurement with, for example, the message 119 by the accuracy-countermeasure teaching unit 118 may cause the operator to perform the measurement.

As described above, for both the rapid temperature change and the gradual temperature change, performing the measurement of the coordinate correction values such as the tool length offset and the workpiece origin at an appropriate timing ensures achieving both ensured accuracy and productivity.

The determination example 3 assumes measurement for calibrating an accuracy of a machine tool.

Figure 7:
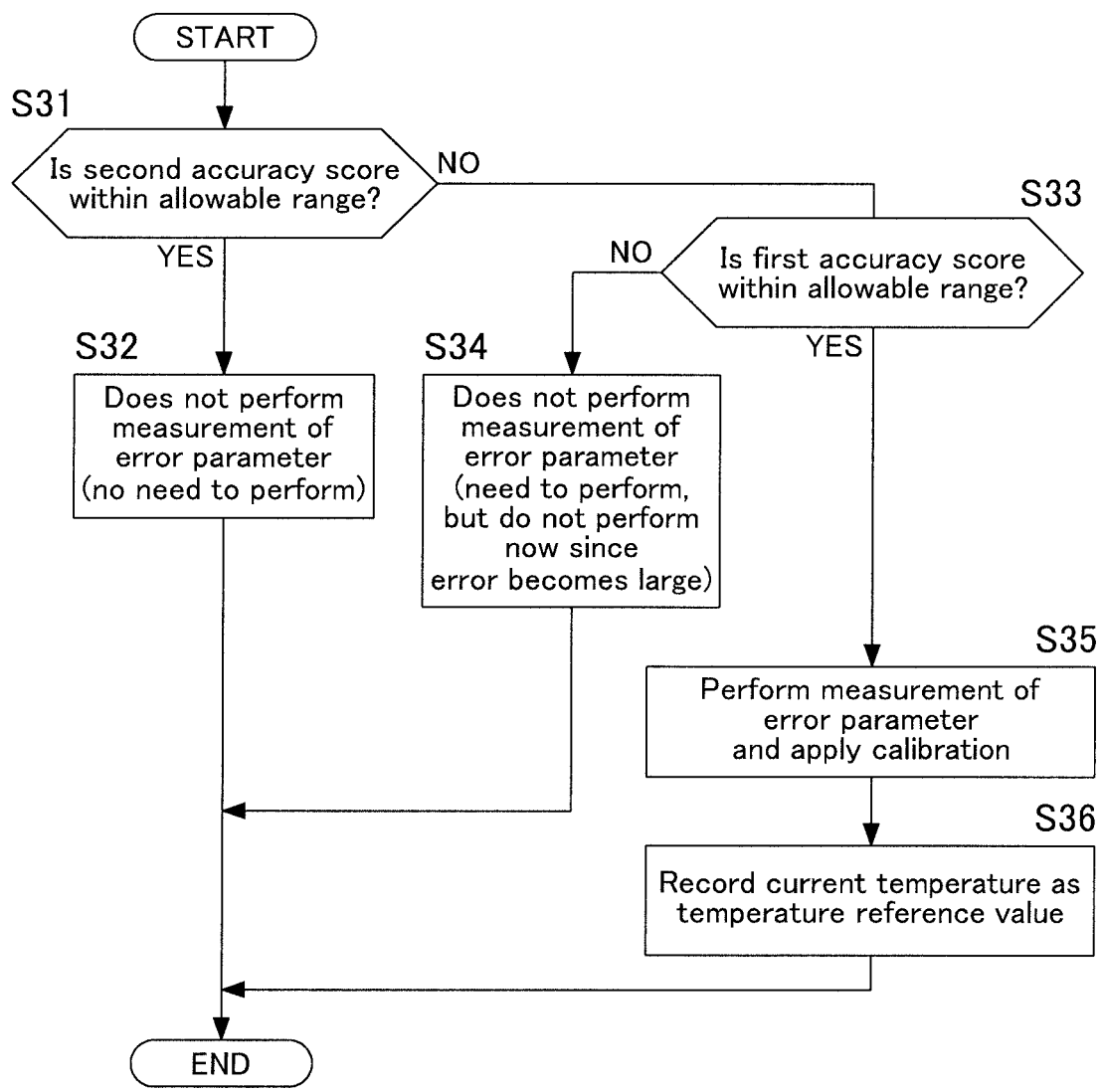
FIG. 7 is a flowchart for determining a timing of a measurement execution when a measurement for calibrating an accuracy is performed.

FIG. 7 is a flowchart for determining a timing of measurement implementation when performing measurement for calibrating an accuracy. That is, FIG. 7 is a flowchart indicating the determination method of the accuracy-countermeasure determining unit 117 and the accuracy countermeasure to be performed, in the determination example 3.

In the five-axis machining center 1, the accuracy is calibrated by measuring error parameters, such as the center position of a rotation shaft, positioning of a scale of a rectilinear axis, and an inclination between the rectilinear axes and performing the correction corresponding to the respective error parameters. However, a long period of time is required to measure and calibrate the various error parameters. For example, when the temperature rapidly changes during the measurement of the error parameter, it is difficult to obtain the effect of the accuracy improvement by sufficient calibration due to a large measurement error. While frequent implementation of the calibration ensures the high accuracy, production is suspended during the measurements. Therefore, it is required to perform the measurement at the minimum necessary timing. Thus, the accuracy diagnostic device 7 determines an optimum timing in performing the measurement for calibrating the accuracy while achieving both the accuracy improvement and the productivity.

First, the second accuracy score 110 is checked whether it is within the range of the allowable range 115 (S31) or not. When the second accuracy score 110 is within the range of the allowable range 115, that is, when the temperature change since a time point of the previous implementation of calibration is small, it is determined that the implementation of calibration is unnecessary, and the measurement is not performed (S32). On the other hand, when the second accuracy score 110 is not within the range of the allowable range 115, that is, when the temperature change since the time point of the previous implementation of calibration is large, it is determined that the implementation of calibration is necessary. However, since performing the calibration during occurrence of the rapid temperature change leads to the large measurement error, the first accuracy score 109 is checked whether it is within the range of the allowable range 115 (S33) or not to confirm the state of the temperature change. When the first accuracy score 109 is not within the range of the allowable range 115, that is, when the rapid temperature change is occurring, the calibration is not immediately implemented. The calibration is implemented at a time point at which the temperature change becomes gradual and the first accuracy score 109 falls within the range of the allowable range 115. When the first accuracy score 109 is within the range of the allowable range 115, since the temperature change is gradual and thus the measurement of the error parameter can be accurately performed, the measurement of the error parameter is performed to apply the calibration (S35). Then, the temperature at the time point is recorded as the temperature reference value 104 (S36). With the processing, since the difference between the current temperature and the temperature reference value 104 becomes zero, the second accuracy score 110 falls within the range of the allowable range 115, and the accuracy becomes in a good state.

The measurement at S35 may be automatically performed by the machine with the position measurement sensor 3, such as the touch probe, by the accuracy-countermeasure execution unit 120 outputting a command to the control device 9. Instead, teaching an operator the necessity of the measurement with, for example, the message 119 by the accuracy-countermeasure teaching unit 118 may cause the operator to perform the measurement.

As described above, the allowed determination of an optimum timing to perform the measurement for calibrating the accuracy of the machine tool ensures achieving both accuracy improvement and productivity.

The accuracy diagnostic device 7 with the above-described configuration includes the temperature-reference-value recording unit 103 for recording the temperature reference value 104 in the five-axis machining center 1, which includes the machine body temperature sensor 4 and the temperature sensor 5 that measure the temperature change due to the use environment and the operational motion. The accuracy diagnostic device 7 obtains the temperature data 101 measured by the machine body temperature sensor 4 and the temperature sensor 5, and diagnoses the change of the accuracy of the five-axis machining center 1 based on the first change index (first temperature index 106) and the second change index (second temperature index 107). The first change index is derived from the magnitude of the temperature change per a predetermined period, and the second change index is derived from the current temperature and the temperature reference value 104.

With the accuracy diagnostic device 7 configured as described above, use of the first temperature index 106 and the second temperature index 107 allows diagnosing the accuracy of the five-axis machining center 1 for both situations of the rapid temperature change and the gradual temperature change. The first temperature index 106 and the second temperature index 107 are derived based on the temperature change by the installation environment and the operational motion of the five-axis machining center 1.

The accuracy diagnostic device 7 includes the accuracy diagnosis unit 112. The accuracy diagnosis unit 112 diagnoses the change of the accuracy of the five-axis machining center 1 based on the first temperature index 106 to derive the first diagnostic result 113, and diagnoses the change of the accuracy of the five-axis machining center 1 based on the second temperature index 107 to derive the second diagnostic result 114.

Accordingly, diagnosing both the first temperature index 106 and the second temperature index 107 allows diagnosing whether the rapid temperature change is occurring or not and whether the long-term temperature change is occurring or not, respectively.

The accuracy diagnostic device 7 includes the accuracy-score calculator 108. The accuracy-score calculator 108 calculates the first accuracy score 109, in which the magnitude of the influence on the accuracy of the five-axis machining center 1 by the temperature is quantified based on the first temperature index 106. The accuracy-score calculator 108 also calculates the second accuracy score 110, in which the magnitude of the influence on the accuracy of the five-axis machining center 1 by the temperature is quantified based on the second temperature index 107.

Accordingly, continuously presenting values as the first accuracy score 109 and the second accuracy score 110 allows grasping how stable the accuracy is, not whether the accuracy of the five-axis machining center 1 is good or poor.

The accuracy diagnosis unit 112 derives the first diagnostic result 113 from the first accuracy score 109 and derives the second diagnostic result 114 from the second accuracy score 110, based on the allowable range 115.

Accordingly, the quality of the accuracy of the five-axis machining center 1 can be diagnosed in consideration of stability of the accuracy of the five-axis machining center 1.

The accuracy diagnostic device 7 includes the accuracy-countermeasure determining unit 117 that determines the accuracy countermeasure for ensuring the accuracy of the five-axis machining center 1 using a combination of the first diagnostic result 113 and the second diagnostic result 114.

Accordingly, determining the countermeasure for ensuring the accuracy of the five-axis machining center 1 by combining the first diagnostic result 113 and the second diagnostic result 114 allows determining what to do for ensuring the accuracy of the five-axis machining center 1. Furthermore, even when any of the rapid temperature change and the long-term temperature change occurs, the countermeasure for ensuring the accuracy of the five-axis machining center 1 can be appropriately determined.

The accuracy diagnostic device 7 includes the accuracy-countermeasure execution unit 120. The accuracy-countermeasure execution unit 120 executes or cancels the machining with the five-axis machining center 1 or the program performing temperature measurement by the machine body temperature sensor 4 and the temperature sensor 5, in accordance with the accuracy countermeasure determined by the accuracy-countermeasure determining unit 117.

Accordingly, it is possible to perform the machining and the measurement while automatically ensuring the accuracy of the five-axis machining center 1, thereby the productivity can be improved.

The above is a description of the disclosure based on the illustrated examples, and the technical scope is not limited to the description. For example, the machine tool may be other than the five-axis machining center.

Furthermore, the change amount that is a basis of the change index is not limited to the temperature, and may be, for example, a load value or similar value.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An accuracy diagnostic method for a machine tool that diagnoses an accuracy of the machine tool, wherein the machine tool includes a change amount detection unit that measures a temperature change amount and a change-amount-reference value recording unit that records and updates the temperature as a reference value of the change amount in response to a reference-value recording command, which is commanded by any one of (1) an operating panel and/or a screen, (2) executing a program, and (3) in conjunction with a specific operation of the machine tool, the change quantity changing due to an installation environment and an operational motion, wherein the accuracy diagnostic method comprises:

obtaining the change amount from the change amount detection unit;

diagnosing a change of the accuracy of the machine tool based on a first change index and a second change index; and deriving a first diagnostic result by diagnosing the change of the accuracy based on the first change index, and deriving a second diagnostic result by diagnosing the change of the accuracy based on the second change index, wherein the first change index and the second change index are each derived from the temperature change amount, wherein the first change index is derived from a magnitude of a change of the change amount per a predetermined period, and the second change index is calculated from a difference between the current change amount and the reference value, which is recorded in the change-amount-reference-value recording unit, wherein a value of the second change index is changed when the reference-value recording command is commanded, wherein the first diagnostic result is represented as good or poor depending on whether the measured change of accuracy is above or below a predetermined threshold, and the second diagnostic result is represented as good or poor depending on whether the measured change of accuracy is above or below a predetermined threshold, and wherein when the first diagnostic result is good and the second diagnostic result is poor, as an accuracy countermeasure for ensuring the accuracy of the machine tool, using a combination of the first diagnostic result and the second diagnostic result, an on-machine-measurement with the machine tool is started and a reset of a correction value of a coordinate of the machine tool is performed, and a current change amount recorded as the reference value.

* * * * *